United States Patent [19]
Weisburn et al.

[11] Patent Number: 5,487,599
[45] Date of Patent: Jan. 30, 1996

[54] STORAGE CABINET FOR RECORDED MEDIA

[75] Inventors: James T. Weisburn, Massillon; Christopher G. Gallagher, Akron, both of Ohio

[73] Assignee: Alpha Enterprises, Inc., North Canton, Ohio

[21] Appl. No.: 308,115

[22] Filed: Sep. 16, 1994

[51] Int. Cl.⁶ .................................................. A47B 81/06
[52] U.S. Cl. .......................... 312/9.46; 312/964; 312/305; 211/163; 211/194
[58] Field of Search ................................. 312/9.45, 9.46, 312/9.47, 9.51, 9.52, 9.53, 9.55, 9.64, 97.1, 125, 305, 111; 211/40, 163, 194

[56] References Cited

U.S. PATENT DOCUMENTS

| | | | |
|---|---|---|---|
| D. 259,450 | 6/1981 | Veralrud | D3/35 |
| D. 298,287 | 11/1988 | Stravitz | D6/407 |
| D. 318,580 | 7/1991 | Sjostrom | D6/407 |
| D. 319,549 | 9/1991 | van der Burg | D6/407 |
| 3,514,170 | 5/1970 | Shawchuk | 312/107 |
| 3,552,579 | 1/1971 | Simon | 312/111 X |
| 3,628,839 | 12/1971 | Vannest | 384/470 |
| 3,736,036 | 5/1973 | Mathus | 312/285 |
| 3,862,787 | 1/1975 | Hilsinger | 312/9.46 X |
| 3,889,817 | 6/1975 | Berkman | 211/163 |
| 4,140,223 | 2/1979 | Rau et al. | 211/78 |
| 4,317,603 | 3/1982 | Pepicelli et al. | 312/9.47 |
| 4,648,737 | 3/1987 | Lake, Jr. et al. | 312/111 X |
| 4,653,649 | 3/1987 | Holdredge, Jr. | 211/194 X |
| 4,741,438 | 5/1988 | Mastronardo et al. | 206/309 |
| 5,024,168 | 6/1991 | Stravitz | 312/249.2 X |
| 5,346,079 | 9/1994 | Price, Jr. et al. | 312/9.46 X |

Primary Examiner—Peter M. Cuomo
Assistant Examiner—James O. Hansen
Attorney, Agent, or Firm—Sand & Sebolt

[57] ABSTRACT

A storage cabinet for recorded media such as audio cassettes, compact discs, video tapes, etc. is formed by a plurality of identical modules. Each module includes top and bottom attachment devices for releasably joining together adjacent modules into a vertical stacked relationship by snap fitting said modules together. A bearing member is removably attached to the bottom surface of the lowermost module for rotatably mounting the stacked joined modules on a support surface. Each of the storage compartments is formed with a plurality of separate storage spaces for receiving individual recorded media. A top cover includes an attachment device for snap fitting it on the top portion of the uppermost module by engagement with the attachment device of said uppermost module. The storage spaces may vary in size for receiving the same or different recorded media within the same module or storage compartment thereof.

16 Claims, 9 Drawing Sheets

STORAGE CABINET FOR RECORDED MEDIA

BACKGROUND OF THE INVENTION

1. Technical Field

The invention relates to a storage cabinet, and in particular, to a storage cabinet for storing various recorded media, such as audio cassettes, video cassettes, compact discs, etc. More particularly, the invention relates to such a storage cabinet which is formed of a plurality of individual components which are snap fitted together to form the cabinet varying in height.

2. Background Information

In recent years, the manufacture, use and sale of recorded media, and in particular, audio cassettes, video cassettes and compact discs, have increased tremendously, most of which are purchased for home use. With the advent of such recorded media, it is desirable to provide a storage cabinet for use with such recorded media to enable the media to be maintained in a well organized fashion, preferably in a single unit placed adjacent the playback mechanism. Various types of storage cabinets have been developed for recorded media, such as shown in U.S. Pat. Nos. Des. 298,287; Des. 259,450; Des. 319,549; Des. 318,580; 3,514,170; 4,741,438; and 3,736,036.

It is always desirable when producing such a cabinet that the cabinet be manufactured as inexpensively as possible without sacrificing quality, in order to increase the sales thereof and provide a suitable profit for the manufacturer and distributors thereof. It is desirable that in the manufacture of any product, that the number of components be maintained at a minimum, thereby reducing manufacturing and inventory costs, yet providing a product, such as a storage cabinet, which is versatile and better able to meet the needs of the purchasing public than other products on the market.

In the storage of such recorded media, it is desirable that the capacity of the cabinet be variable, since the purchaser may only have a few of the recorded media in contrast to other purchasers which have a vast collection of such media. Therefore, it is desirable that the storage capacity of the product be variable and easily assembled, either by the manufacturer or by the user, to promote the desirability and salability of the product.

Therefore, the need has existed for an improved storage cabinet which is formed of a minimum number of components, yet which can be constructed in various sizes in order to match the desires and needs of the purchasing public.

SUMMARY OF THE INVENTION

Objectives of the invention include providing an improved storage cabinet for recorded media which is formed of a relatively few components, which components can be readily assembled, preferably by a snap-fit connection, avoiding the use of adhesives or other types of mechanical fasteners for joining the components together.

Another objective is to provide such a storage cabinet which is formed by a number of identical modules, thereby reducing the manufacturing cost of the individual modules, and in which the selective height of the storage cabinet is determined by incorporating one or more of the modules in a vertical stacked relationship.

A further objective of the invention is to provide such a storage cabinet in which the storage modules, as well a top cover and mounting base, can be mass produced relatively inexpensively by plastic injection molding techniques, and in various colors, thereby providing a cabinet which is satisfactory for its intended purpose at a minimum cost, and which is sturdy and durable in use.

A still further objective of the invention is to provide such a storage cabinet in which the stacked modules are rotatably mounted on a base, enabling the contents of the module to be readily ascertainable and retrievable by the user upon rotation of the stacked modules.

Another objective of the invention is to provide such a storage cabinet in which each side of the cabinet is provided with a storage compartment, which compartment may be divided into individual storage spaces, adaptable for receiving either compact discs, audio tapes, video tapes, or a combination thereof, and in which the spline of the recorded medium is readily viewable, whereby the contents of the recorded medium is readily observed by the user.

These objectives and advantages are obtained by the storage cabinet of the present invention, the general nature of which may be stated as including a plurality of polygonal-shaped cabinet modules arranged in a vertical stacked relationship, each module having four sides, with a storage compartment being formed in certain sides thereof; a first attachment device provided on an upper portion of each of said modules; a second attachment device provided on a bottom portion of each of said modules adaptable for mating engagement with the first attachment device of a lower module to secure said modules in a stacked relationship; a top cover having an attachment device engageable with the first attachment device of an uppermost module to secure said cover on said uppermost module; base means mounted on the bottom portion of a lowermost module for rotatably supporting the plurality of stacked modules on a support surface; and mounting means for mounting the base means on the bottom portion of said lowermost module.

BRIEF DESCRIPTION OF THE DRAWINGS

A preferred embodiment of the invention, illustrative of the best mode in which applicants have contemplated applying the principles, are set forth in the following description and are shown in the drawings and are particularly and distinctly pointed out and set forth in the claims.

Similar numerals refer to similar parts throughout the drawings.

DESCRIPTION OF THE PREFERRED EMBODIMENT

Figure 1:
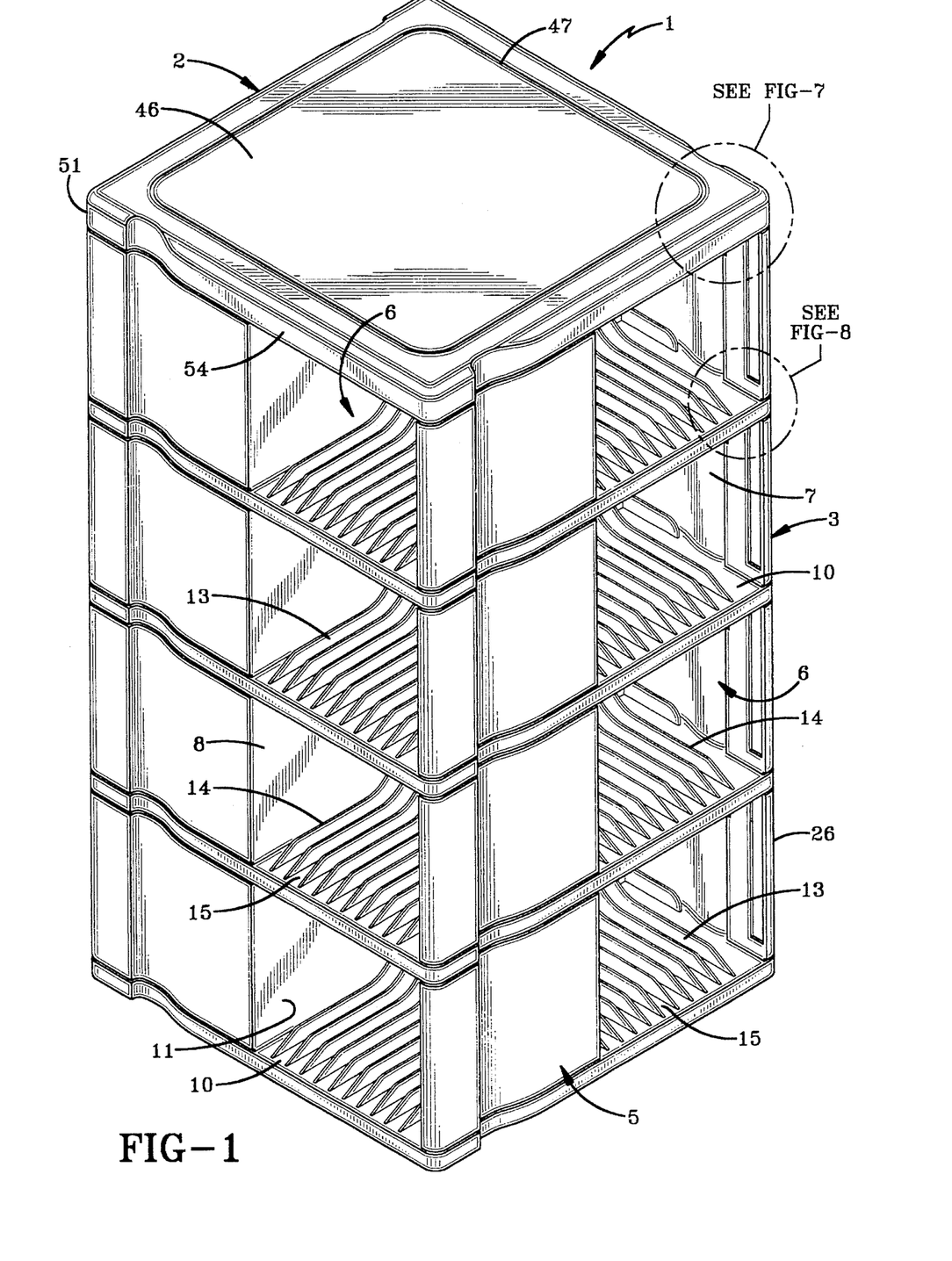
FIG. 1 is a perspective view of the storage cabinet of the present invention.
Figure 6:
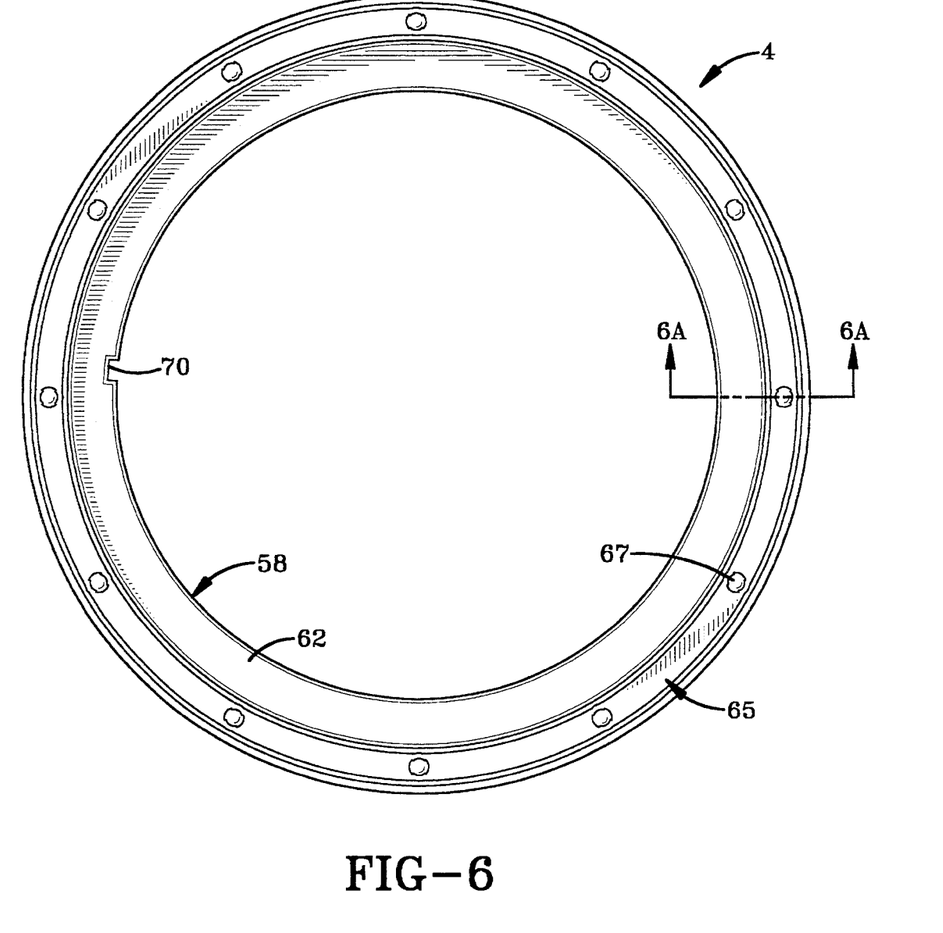
FIG. 6 is a top plan view of the base of the storage cabinet.

The storage cabinet of the present invention is indicated generally at 1, and is shown in FIG. 1. Cabinet 1 includes a top cover, indicated generally at 2, and a plurality of vertically stacked modules, each of which is indicated at 3, and a base indicated generally at 4 (FIG. 6). Four modules 3 are shown in a vertical stacked relationship in FIG. 1 for illustration purposes only, and cabinet 1 could comprise only a single module 3 or two or more modules, up to any usable vertical height, without affecting the concept of the invention.

Figure 2:
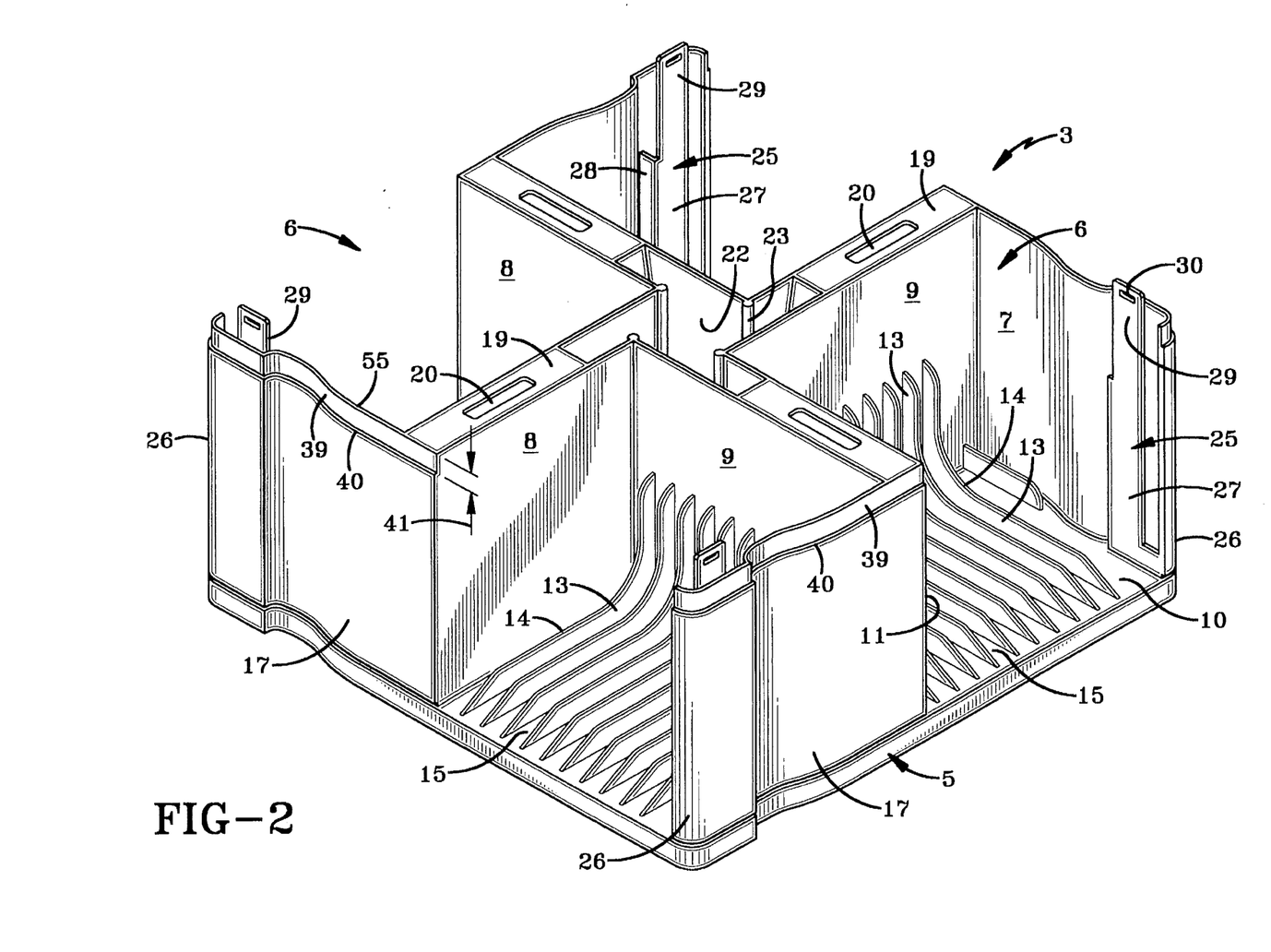
FIG. 2 is a perspective view of one of the modules of the storage cabinet of FIG. 1.
Figure 3:
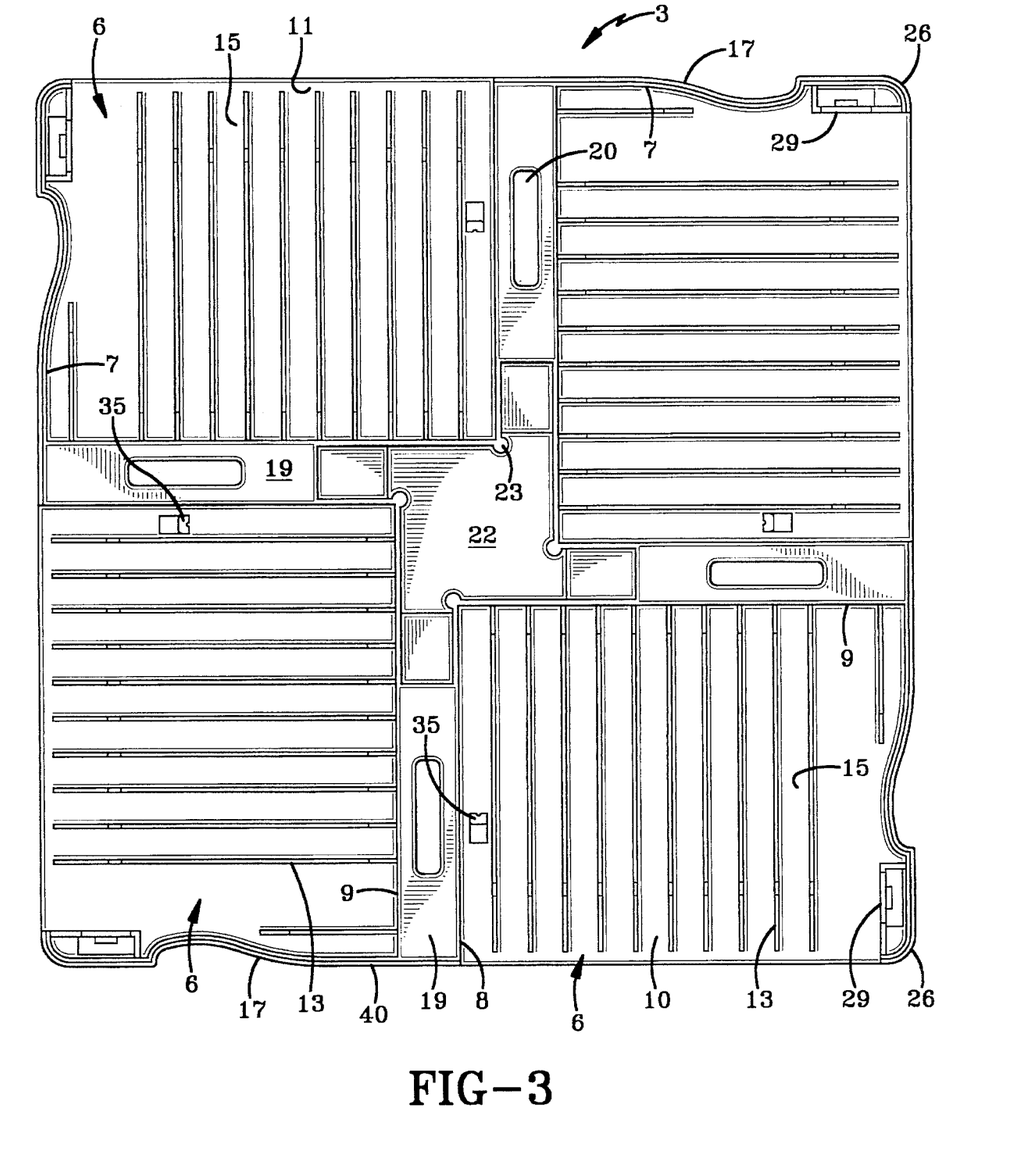
FIG. 3 is a top plan view of the storage module of FIG. 2.
Figure 4:
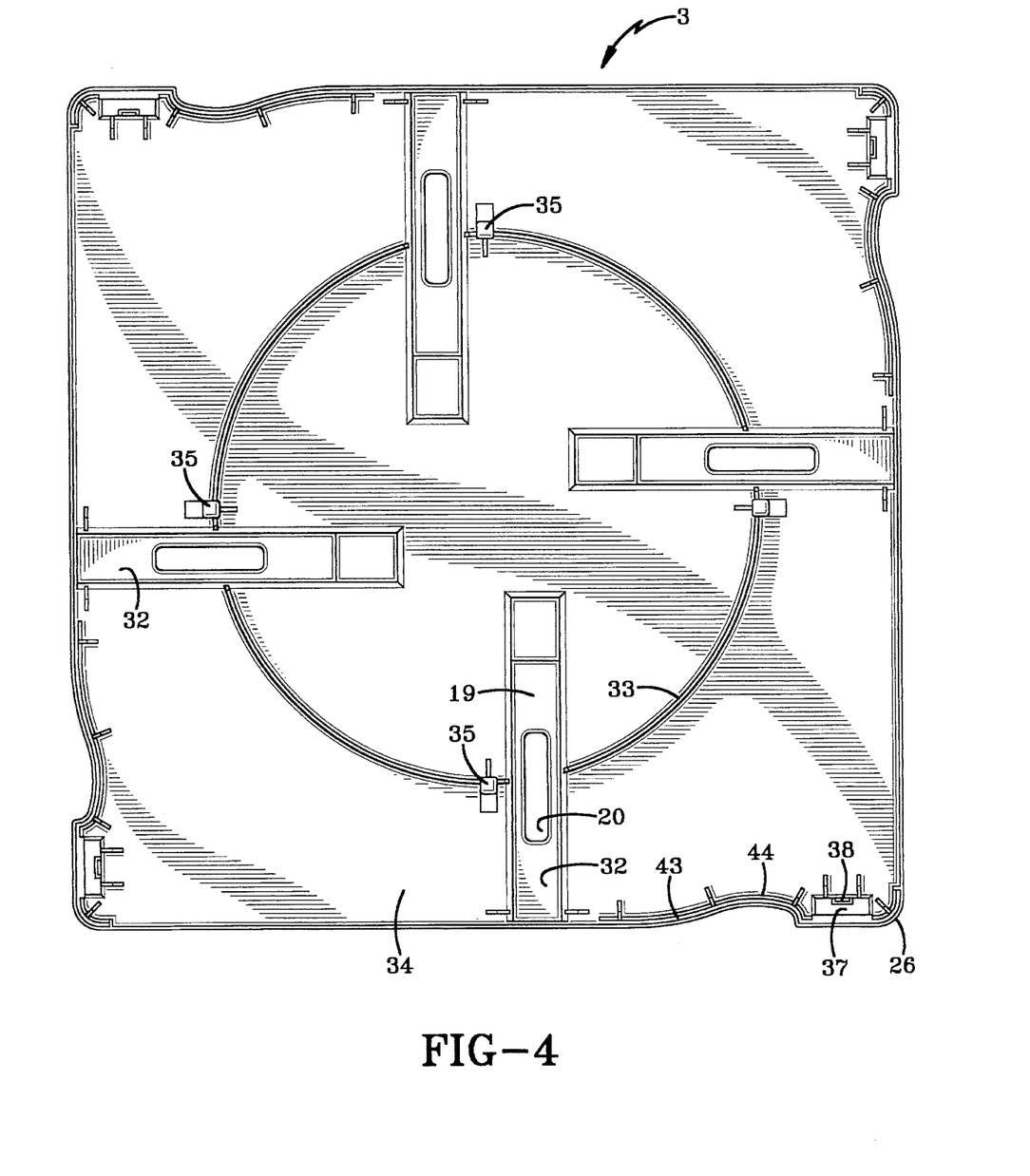
FIG. 4 is a bottom plan view of the module of FIG. 2.

Module 3 is shown particularly in FIGS. 2–4, and preferably is formed of a plastic material by an injection molding process. In accordance with one of the features of the invention, each module 3 may be identical, and therefore, only one is shown in detail and described below.

Module 3 has a polygonal shape, that is, four sided, with each side being substantially identical to the other side. Each side, which is indicated generally at 5, includes a storage compartment 6 which is formed by spaced side walls 7 and 8, a back wall 9, and a bottom wall 10, with a front access opening 11. Each storage compartment is provided with a plurality of parallel spaced ribs 13 which extend horizontally and vertically along bottom wall 10 and back wall 9 and have curved edges 14 to assist in guiding the particular recorded medium into the individual storage spaces 15 formed between each pair of ribs. The spacing between the ribs may vary so that the storage spaces are sized for the particular type of recorded media to be placed therein. For example, the space for an audio cassette would have a smaller width than that for a video cassette. Likewise, this spacing could be adjusted for receiving compact discs, and in particular, the jewel boxes in which the compact discs are usually stored. Preferably, the ribs extend generally throughout the length of the bottom wall 10, and only partially along back wall 9, as shown in FIG. 2.

Each storage compartment 6 occupies approximately one-half the length of each side 5, with the remaining or other half portion of side 5 being a continuous wall or surface 17 which forms the side wall of the adjacent storage compartment oriented 90° therefrom. Back walls 9 and side walls 8 of adjacent storage compartments are separated from each other as shown in FIGS. 2–4, and are joined at their top edges by a top cover wall 19 which is formed with an elongated opening 20. Walls 19 provide rigidity to module 3 and openings 20 assist in the injection molding of the module. Back walls 9 merge together in an offset relationship at an irregularly shaped central opening 22, and are joined together by reinforcing ribs 23 (FIG. 2).

Figure 7:
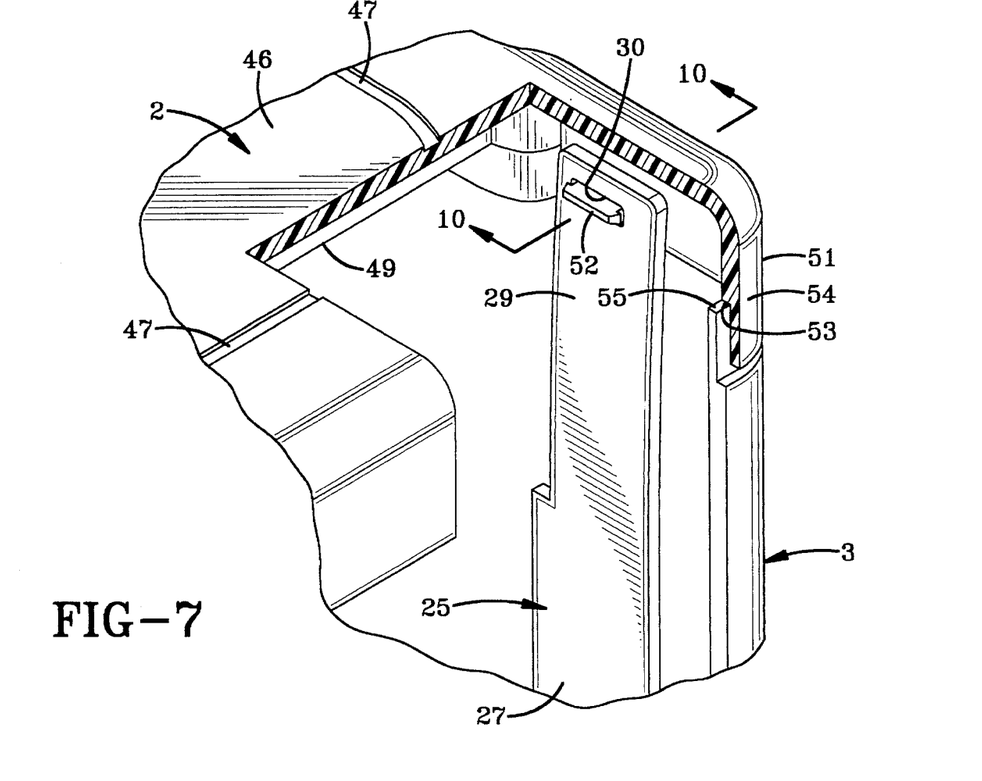
FIG. 7 is an enlarged fragmentary view with portions broken away and in section of the encircled portion of FIG. 1.

In accordance with another feature of the invention, each module 3 includes a flexible finger, indicated generally at 25, adjacent each corner 26 for releasably connecting the module to an upper adjacent module, when the modules are placed in a stacked relationship, as shown in FIG. 1, or for connecting the module to top cover 2, as described further below. Each finger 25 is an elongated strip-like member (FIGS. 2 and 7) having a lower portion 27 which is connected to the adjacent sidewall 7 by a connecting strip 28. This forms a free flexible upper finger portion 29 which extends above the horizontal plane of module 3, and is formed with a slotted opening 30.

Referring particularly to FIG. 4, the bottom portion of module 3 is formed with four rectangularly shaped openings 32 which extend generally throughout the height and between side walls 8 and back walls 9 of adjacent storage compartments, and which terminate at their upper ends at top wall 19, as described above. A circular rib 33 is formed in the center of the bottom wall or surface 34, and a plurality of tabs 35 are formed generally at 90° with respect to each other on bottom surface 34 adjacent rib 33. Circular rib 33 and tabs 35 are used for mounting base 4 thereon, as described further below.

Figure 11:
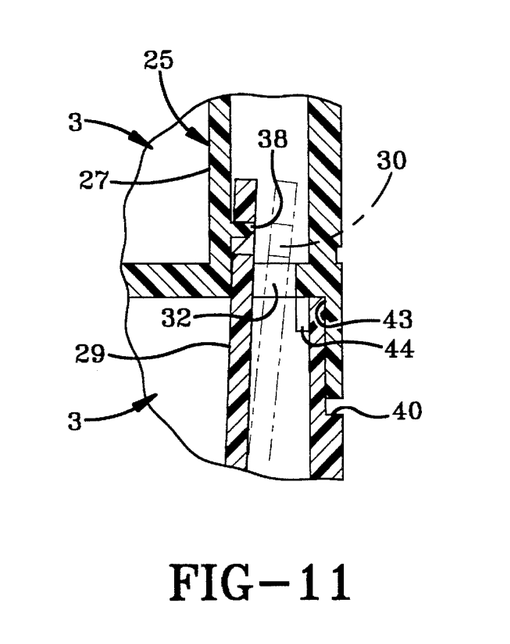
FIG. 11 is a further enlarged fragmentary sectional view taken on line 11—11, FIG. 8, with the flexible fingers shown disengaged in phantom lines.

An opening 37 (FIG. 4) is formed in bottom wall 34 adjacent each corner 26 at the bottom of lower finger portion 27. A locking nub 38 is located adjacent opening 37 at the bottom of finger 25 and is adapted to be snap fitted into opening 30 of a finger 25 of a lower module 3 which extends through opening 32, as shown particularly in FIG. 11, for joining together upper and lower modules in a snap-fitted relationship.

Figure 8:
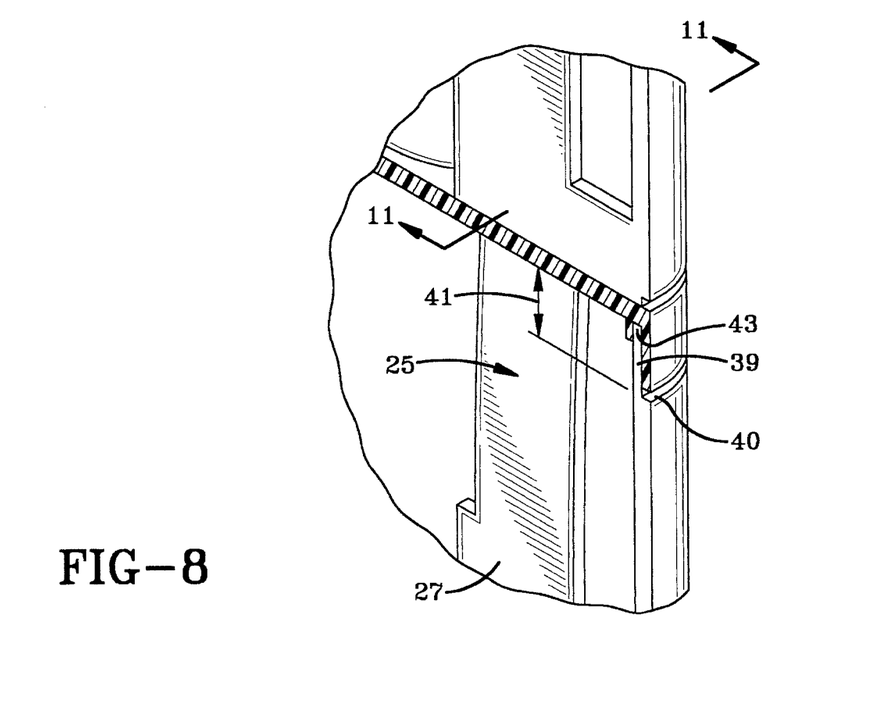
FIG. 8 is an enlarged fragmentary view with portions broken away and in section of the encircled portion of FIG. 1.

As shown in FIG. 2, the upper end of each side wall 17 is formed with an offset top portion 39 which joins the remainder of wall 17 at a lip 40. Portion 39 has a height 41, as shown in FIG. 2, which is slidably received in a channel 43 (FIGS. 4 and 8) formed adjacent the bottom edges of side walls 17 for telescopically mating the top portion of a lower module with a bottom portion of an upper module. Channels 43 are formed by a curved rib 44 which is spaced inwardly from the bottom edge of wall 17, having a spacing complementary to the thickness of the top edge of module side wall 17. This telescopic engagement and joinder of the two modules is clearly shown in FIGS. 8 and 11.

Thus, to join two adjacent modules, flexible finger portions 29 of a lower module are snap fitted into engagement with locking nubs 38 of an upper module, with the top edges of the side walls of the lower module being telescopically received within channels 43 formed in the bottom portion of the upper module. This relationship provides for a slip-fit, snap-fit joinder of the two modules, enabling a plurality of such modules to be stacked in a vertical relationship. Preferably, each module is identical, thereby not requiring additional components to be manufactured, stored and shipped when forming cabinet 1 of varying heights and storage capacity. Thus, this provides the versatility of a storage cabinet of varying vertical height, with different amounts of storage compartments and spaces therein, depending upon the number of modules selected and assembled in the vertical stacked relationship, as shown in FIG. 1.

Figure 5:
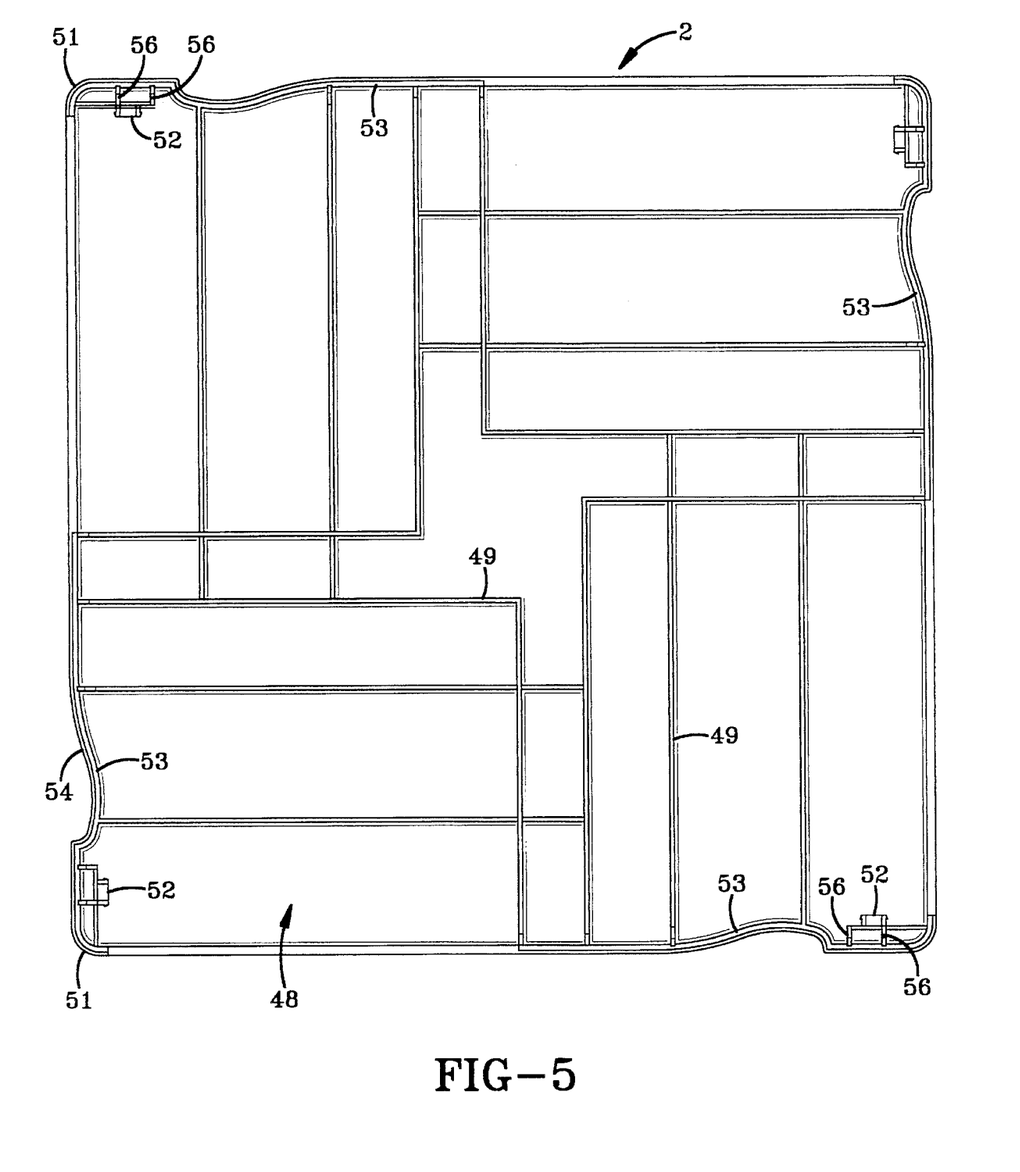
FIG. 5 is a bottom plan view of the top cover of the storage cabinet.

In accordance with another feature of the invention, top cover 2 is snap fitted into mounting engagement with the top portion of the uppermost module 3. Top cover 2 is shown particularly in FIGS. 1, 5, 7 and 10, and has a rectangular shape complementary to the size of module 3, and includes a top surface 46 which may have a decorative rectangular recess 47 formed therein. Most importantly, bottom surface 48 of top cover 2 (FIG. 5) is formed with a plurality of interconnected ribs 49 which strengthen the top cover and rest upon top cover wall 19 of the uppermost module to provide for an overall rigid cabinet structure.

Figure 10:
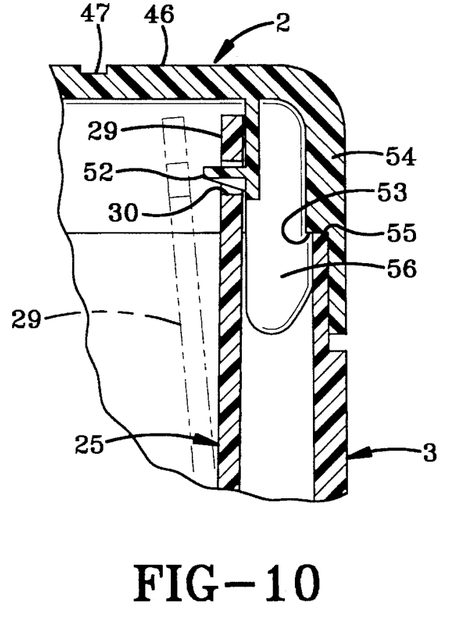
FIG. 10 is a further enlarged fragmentary sectional view taken on line 10—10, FIG. 7 with the flexible fingers shown in a disengaged position in phantom lines.

A locking nub 52 if formed adjacent each corner 51 of cover 2 and is snap fitted within elongated opening 30 of flexible finger portion 29 of the topmost module 3 for snap-fit mounting of top cover 2 on this module 3 (FIG. 10). The top cover is also formed with four curved shoulders 53 or edges which extend along a portion of the inside surface of top cover side wall 54 (FIGS. 1, 5, 7 and 10). Shoulders 53 abut top edges 55 of side walls 17 of the topmost module, which assists in seating cover 2 onto module 3 (FIG. 10). A pair of reinforcing projections 56 are located adjacent each locking nub 52 and extend downwardly along top flexible portion 29 of each finger 25 and assist in maintaining the fingers in engagement with nubs 52 and in retaining the telescopically joined edge portions of top cover 2 and module 3, as shown particularly in FIG. 10. This further increases the rigidity and joinder of top cover 2 on the upper portion of adjacent module 3.

Figure 6A:
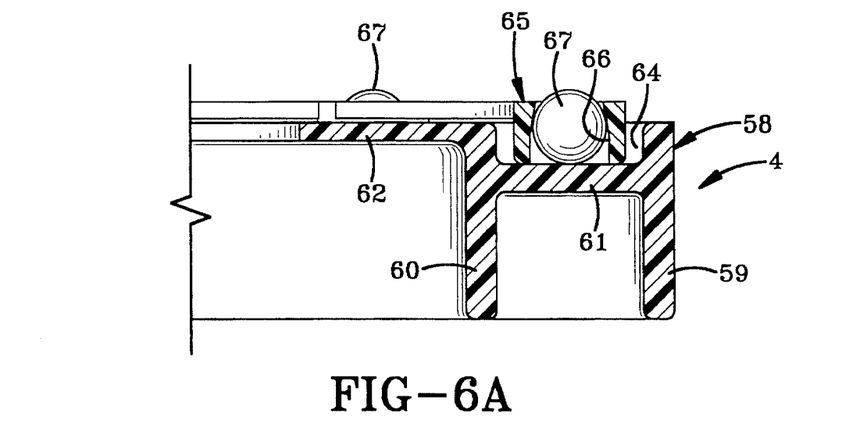
FIG. 6A is an enlarged fragmentary sectional view taken on line 6A—6A, FIG. 6.

In accordance with another feature of the invention, base 4 rotatably mounts either a single module 3 or a plurality of the stacked modules 3 on a support surface. Base 4 (FIGS. 6, 6A and 9) includes an annular base member 58 formed by a pair of vertical rings 59 and 60 joined together by an intervening top wall or web 61. An inwardly extending annular flange 62 is formed integrally with inner ring 60 and assists in forming an annular recess 64 between vertical rings 59 and 60. A bearing ring, indicated generally at 65, includes a plurality of circumferentially spaced pockets 66 in which is snap fitted and movably mounted bearing balls 67. Bearing ring 65 is seated in annular recess 64 with bearing balls 67 extending beyond the horizontal plane of the bearing ring, as shown particularly in FIG. 6A, with the exposed top portions of each bearing ball 67 engaging bottom surface 34 (FIG. 9) of the adjacent module for rotatably mounting the adjacent module, and those modules stacked thereon, on base 58.

Figure 9:
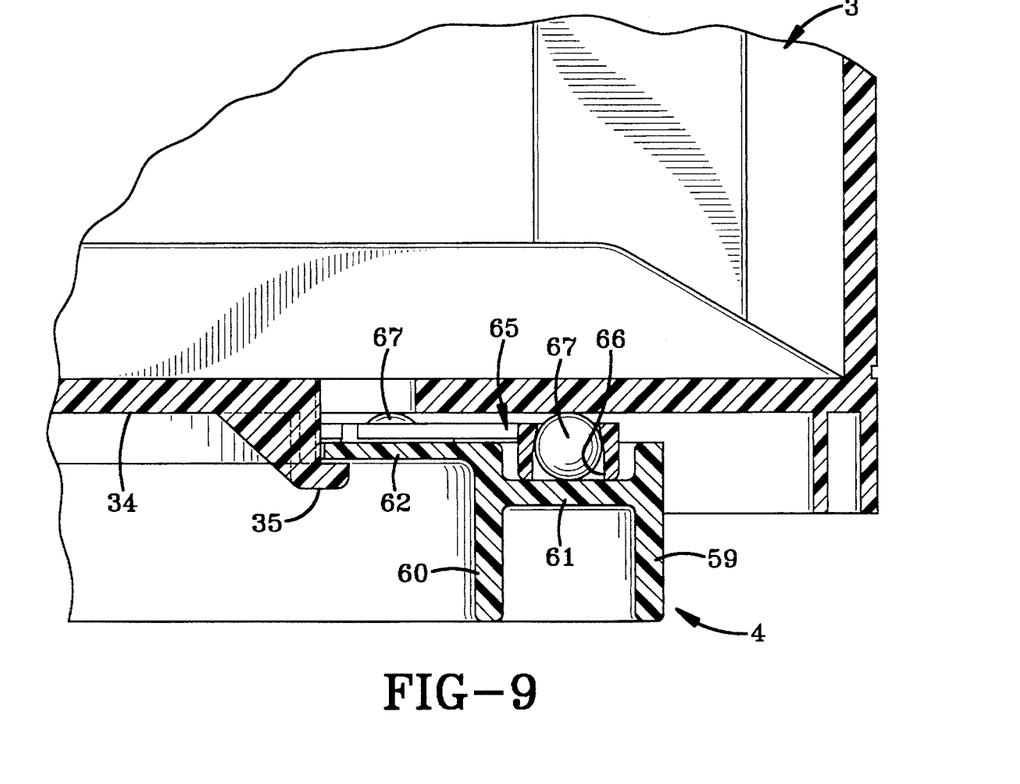
FIG. 9 is an enlarged fragmentary sectional view showing the mounting of the base member of FIGS. 6 and 6A with the bottom portion of the lowermost module.

A notch 70 (FIG. 6) is formed in an inner edge of annular flange 62 of base member 58 and enables a tab 35, which extends downwardly from the bottom surface 34 of module 3, to be inserted therethrough, after which base member 58 can be rotated until the four bottom wall tabs 35 of a module 3 extend over and engage flange 62, as shown in FIG. 9, to mount base member 58 onto bottom surface 34 of module 3, trapping the bearing ring 65 therebetween. This enables module 3 to rotate with respect to base 4, as base 4 remains in a stationary position on a supporting surface.

Again, the individual parts of base 4 are assembled easily on a module 3 by a simple snap-fit and rotational motion, eliminating the need for any additional fasteners, adhesives, or other joining means. Since each of the modules 3 is formed with tabs 35, any module can be mounted on base 4. The tabs on the upper modules, when not in use, merely extend into the upper portion of each storage compartment, where they are out of sight and do not interfere with the inserted recorded medium. All of the components of base 4, with the possible exception of bearing balls 67, preferably are formed of plastic in an injection molding process.

Accordingly, the improved storage cabinet 1 is formed of relatively inexpensive plastic injection-molded materials, with the main storage modules 3 preferably being identical and interchangeable. Modules 3 can be stacked in a vertical relationship, with top cover 2 and base 4 being mounted onto either a single module or the upper and lowermost modules, respectively, where two or more modules are snap fitted together in a vertical stacked relationship. The individual components are snap fitted together into a single unit which can be moved about without becoming disassembled, and in which the stacked modules are rotatably mounted on base 4, which supports the cabinet on a supporting surface. This rotational mounting enables the storage compartments to be easily moved for ease of access and visibility by the user thereof. Also, the individual storage compartments are formed with a plurality of storage spaces of various sizes, depending upon the particular recorded medium to be stored therein.

A slightly modified form of the improved storage cabinet is indicated generally at 75 (FIG. 12), and is very similar to storage cabinet 1 described above, in that each module has the flexible fingers and mating recesses and nubs for joining the modules in a stacked relationship. However, in cabinet 75, lower module 3A is formed with a plurality of storage spaces 15A having a width and vertical height for receiving a compact disc 76 therein, whereas intermediate module 3B is formed with a plurality of storage spaces 15B having a width and vertical height for storing audio cassettes 77 therein. Topmost module 3C is formed with a plurality of storage spaces 15C, and a vertical height sufficient for receiving video tapes 78 therein. This enables a three-module unit to be provided for storing the three most common recorded media, namely, compact disc 76, audio tape 77 and video tapes 78.

Figure 12:
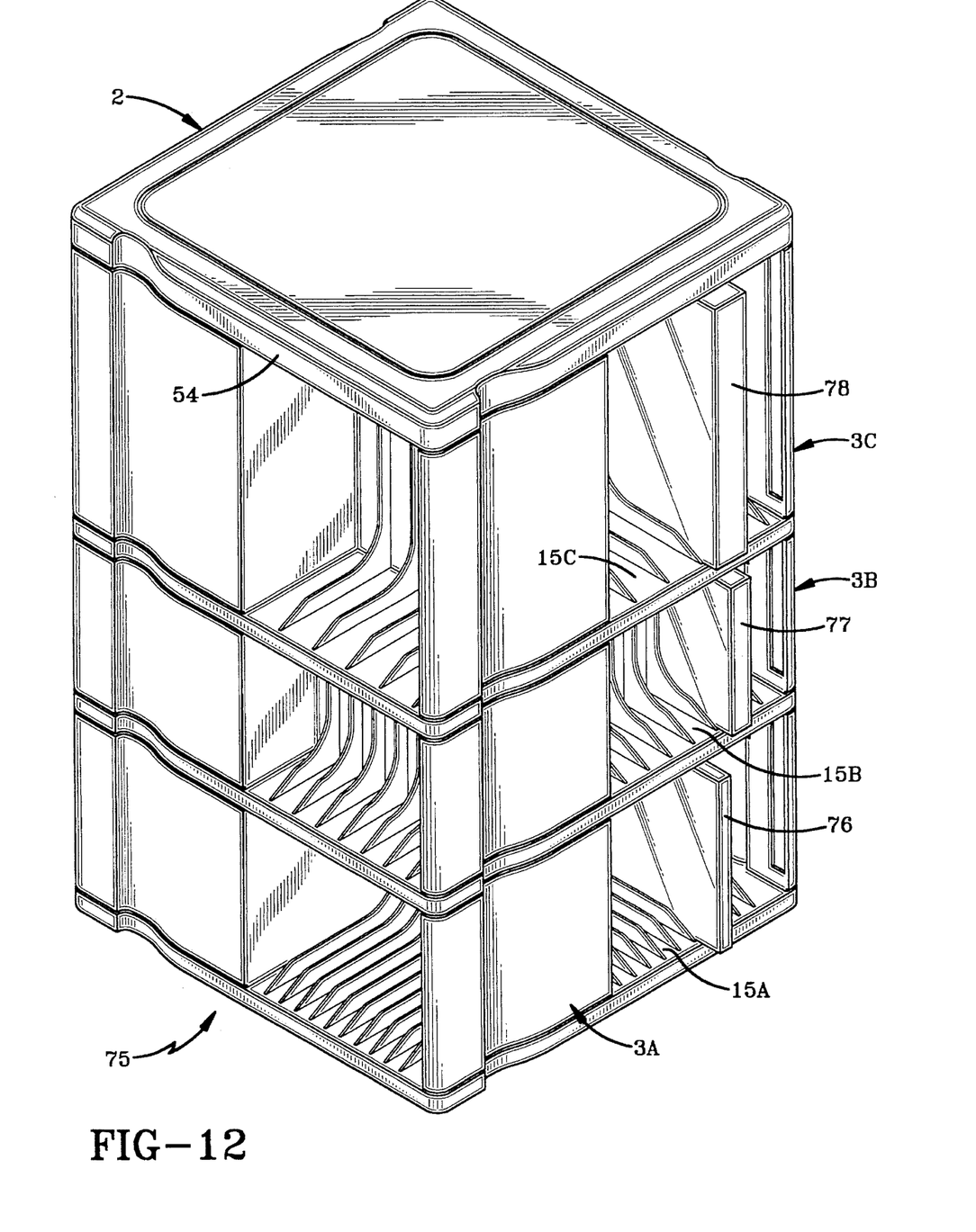
FIG. 12 is a perspective view of a modified form of the storage cabinet as shown in FIG. 1.

Again, the particular stacked arrangement can vary from that shown in FIG. 12 since the connecting fingers and notches are the same as described previously with respect to module 3. Also, additional modules 3A, 3B and 3C could be snap fitted together, thereby providing various combinations of modules, for storing additional compact discs, audio tapes and/or video tapes, all in the same storage unit.

Accordingly, the storage cabinet of the present invention is simplified, provides an effective, safe, inexpensive, and efficient device which achieves all the enumerated objectives, provides for eliminating difficulties encountered with prior devices, and solves problems and obtains new results in the art.

In the foregoing description, certain terms have been used for brevity, clearness and understanding; but no unnecessary limitations are to be implied therefrom beyond the requirement of the prior art, because such terms are used for descriptive purposes and are intended to be broadly construed.

Moreover, the description and illustration of the invention is by way of example, and the scope of the invention is not limited to the exact details shown or described.

Having now described the features, discoveries and principles of the invention, the manner in which the improved storage cabinet is constructed and used, the characteristics of the construction, and the advantageous, new and useful results obtained; the new and useful structures, devices, elements, arrangements, parts and combinations, are set forth in the appended claims.

We claim:

1. A storage cabinet for recorded media including:

a plurality of polygonal-shaped cabinet modules arranged in a vertical stacked relationship, each module having four sides, with a storage compartment being formed in certain sides thereof;

a first attachment device provided on an upper portion of each of said modules, said first attachment device includes a plurality of flexible fingers extending upwardly from the upper portion of the module adjacent certain corners thereof, each of said fingers being formed with an opening forming a first locking member;

a second attachment device provided on a bottom portion of each of said modules adaptable for mating engagement with the first attachment device of a lower module to secure said modules in a stacked relationship, said second attachment device includes a plurality of openings formed in the bottom portion of the module adjacent certain corners thereof for receiving the flexible fingers of the adjacent module therein, and a nub being formed within each of said openings of the bottom portion of the module and extending into the openings of said flexible fingers for forming a second locking member;

a top cover having an attachment device engageable with the first attachment device of an uppermost module to secure said cover on said uppermost module;

base means mounted on the bottom portion of a lowermost module for rotatably supporting the plurality of stacked modules on a support surface; and mounting means for mounting the base means on the bottom portion of said lowermost module.

2. The storage cabinet defined in claim 1 in which the base means includes a base ring having an annular recess formed in a surface thereof and a bearing ring located within said annular recess; and in which the base means includes a plurality of tabs formed on the bottom portion of the lowermost module engageable with the base ring.

3. The storage cabinet defined in claim 2 in which the bearing ring includes an annular strip formed with a plurality of circumferentially spaced pockets; and in which a bearing member is mounted within each of said pockets.

4. The storage cabinet defined in claim 2 in which the base ring is formed with at least one notch for receiving at least one of the tabs therein for mounting the base ring on the bottom portion of the module.

5. The storage cabinet defined in claim 1 in which one of the storage compartments is formed in each of the sides of the modules; and in which a plurality of storage spaces are formed in each of said storage compartments for receiving an individual recorded medium therein.

6. The storage cabinet defined in claim 5 in which the storage spaces are formed by spaced pairs of ribs, said ribs extending both horizontally and vertically within the storage compartments.

7. The storage cabinet defined in claim 6 in which the ribs have curved outer edges for guiding the recorded medium into the storage spaces.

8. The storage cabinet defined in claim 5 in which each of the storage compartments is substantially rectangular and defined by a pair of spaced parallel side walls, intervening back and bottom walls, and a front access opening.

9. The storage cabinet defined in claim 8 in which the storage spaces are formed by spaced pairs of ribs formed on the bottoms and back walls of the storage compartments.

10. The storage cabinet defined in claim 5 in which each of the storage compartments occupies approximately one-half of the side of the module, with the remaining portion of said module side being a substantially continuous surface.

11. The storage cabinet defined in claim 10 in which the substantially continuous surface of each side of the modules forms a side wall of the storage compartment in the adjacent side of said module.

12. A storage cabinet for recorded media including:

a plurality of polygonal-shaped cabinet modules arranged in a vertical stacked relationship, each module having four sides, with a storage compartment being formed in certain sides thereof;

a first attachment device provided on an upper portion of each of said modules;

a second attachment device provided on a bottom portion of each of said modules adaptable for mating engagement with the first attachment device of a lower module to secure said modules in a stacked relationship;

a top cover having an attachment device engageable with the first attachment device of an uppermost module to secure said cover on said uppermost module;

base means mounted on the bottom portion of a lowermost module for rotatably supporting the plurality of stacked modules on a support surface, said base means including a base ring having an annular recess formed in a surface thereof and a bearing ring located adjacent said annular recess; and mounting means for mounting the base means on the bottom portion of said lowermost module, said base means including a plurality of tabs formed on the bottom portion of the lowermost module engageable with the base ring, said base ring being formed with at least one notch for receiving at least one of the tabs therein for mounting the base ring on the bottom portion of said module.

13. The storage cabinet defined in claim 12 in which the first attachment device includes a plurality of flexible fingers extending upwardly from the upper portion of the module adjacent certain corners thereof; and in which the second attachment device includes a plurality of openings formed in the bottom portion of the module adjacent certain corners thereof for receiving the flexible fingers of the adjacent module therein.

14. The storage cabinet defined in claim 13 in which each of the flexible fingers is formed with a first locking member which matingly engages a second locking member formed within each of the openings formed in the bottom portion of each of the modules.

15. The storage cabinet defined in claim 14 in which the first locking member is an opening; and in which the second locking member is a nub matingly engageable within the finger opening.

16. The storage cabinet defined in claim 12 in which the first attachment device includes a flexible finger extending upwardly from the upper portion of the module; and in which the attachment device of the top cover includes a nub for releasably engaging the flexible finger.

* * * * *